United States Patent
Voorhees et al.

(10) Patent No.: US 7,290,066 B2
(45) Date of Patent: Oct. 30, 2007

(54) METHODS AND STRUCTURE FOR IMPROVED TRANSFER RATE PERFORMANCE IN A SAS WIDE PORT ENVIRONMENT

(75) Inventors: William Voorhees, Colorado Springs, CO (US); Mark Slutz, Colorado Springs, CO (US); David Uddenberg, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 446 days.

(21) Appl. No.: 10/803,301

(22) Filed: Mar. 18, 2004

(65) Prior Publication Data

US 2005/0210159 A1    Sep. 22, 2005

(51) Int. Cl.
  *G06F 3/00* (2006.01)
  *G06F 13/00* (2006.01)
  *G06F 13/364* (2006.01)
(52) U.S. Cl. .............................. 710/5; 710/30; 710/33; 710/35
(58) Field of Classification Search .................... 710/5, 710/6.3, 33, 30, 35
See application file for complete search history.

(56) References Cited

U.S. PATENT DOCUMENTS

| | | | |
|---|---|---|---|
| 5,974,502 A | * | 10/1999 | DeKoning et al. .......... 711/114 |
| 6,301,625 B1 | * | 10/2001 | McDonald et al. ............ 710/5 |
| 6,877,045 B2 | * | 4/2005 | Goode et al. .................. 710/6 |

* cited by examiner

*Primary Examiner*—Kim Huynh
*Assistant Examiner*—Joshua D. Schneider
(74) *Attorney, Agent, or Firm*—Duft, Bornsen & Fishman

(57) ABSTRACT

Methods and associated structure for utilizing multiple ports or PHYs comprising a SAS wide port to improve transmission bandwidth utilization for a single large I/O request. In one aspect hereof, a large I/O request is broken into a plurality of smaller I/O requests to be distributed over multiple PHYs or ports of a configured wide SAS port. The number of smaller I/O requests may be any number up to the maximum number of PHYs or ports comprising the SAS wide port. In another aspect hereof, the size of a large I/O request may be compared against a threshold value to determine whether the large request should be broken into smaller requests. The threshold value may be determined in accordance with features and aspects hereof either statically or dynamically based on workloads assigned to, and utilization of, the configured SAS wide port.

22 Claims, 4 Drawing Sheets

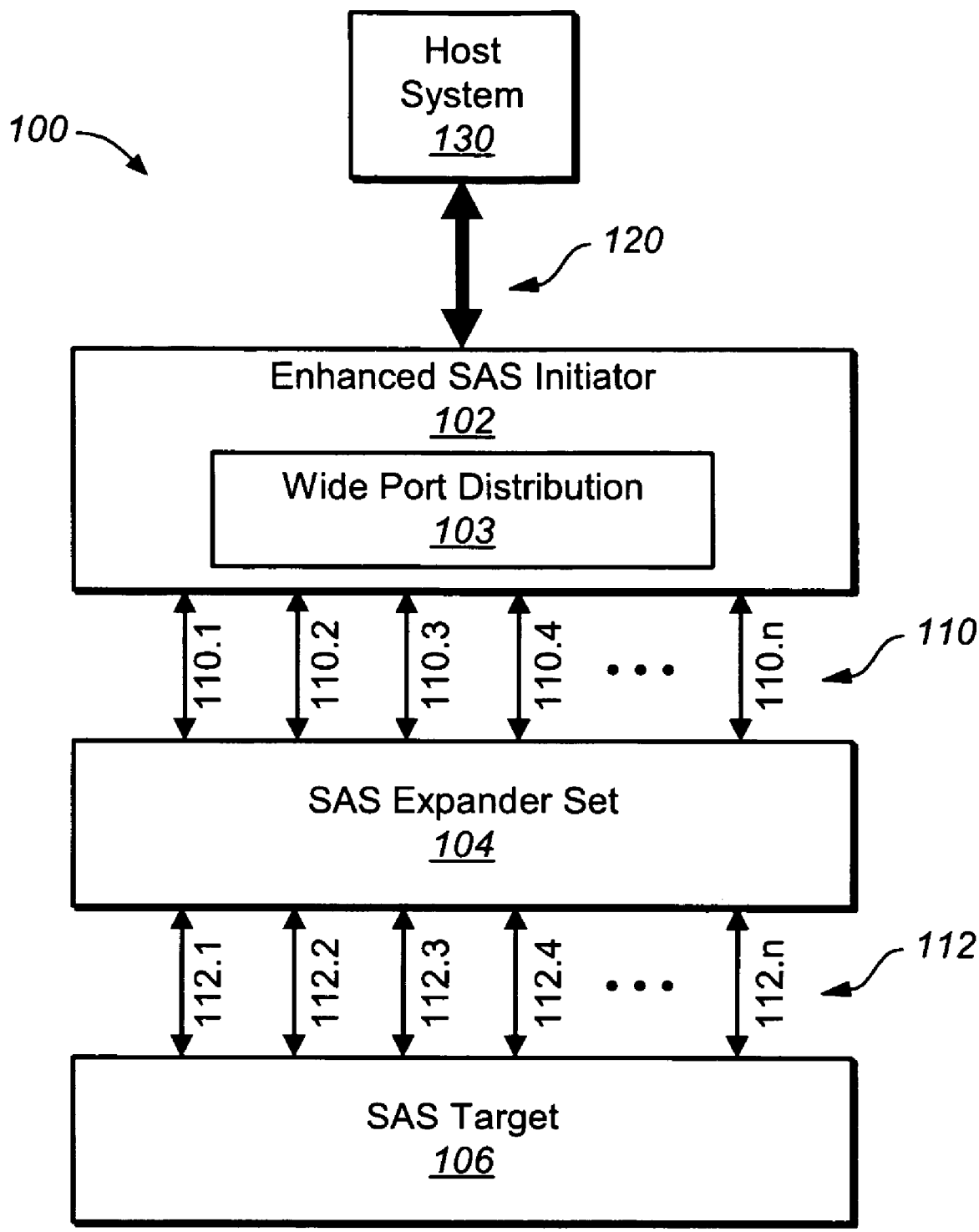
FIG._1

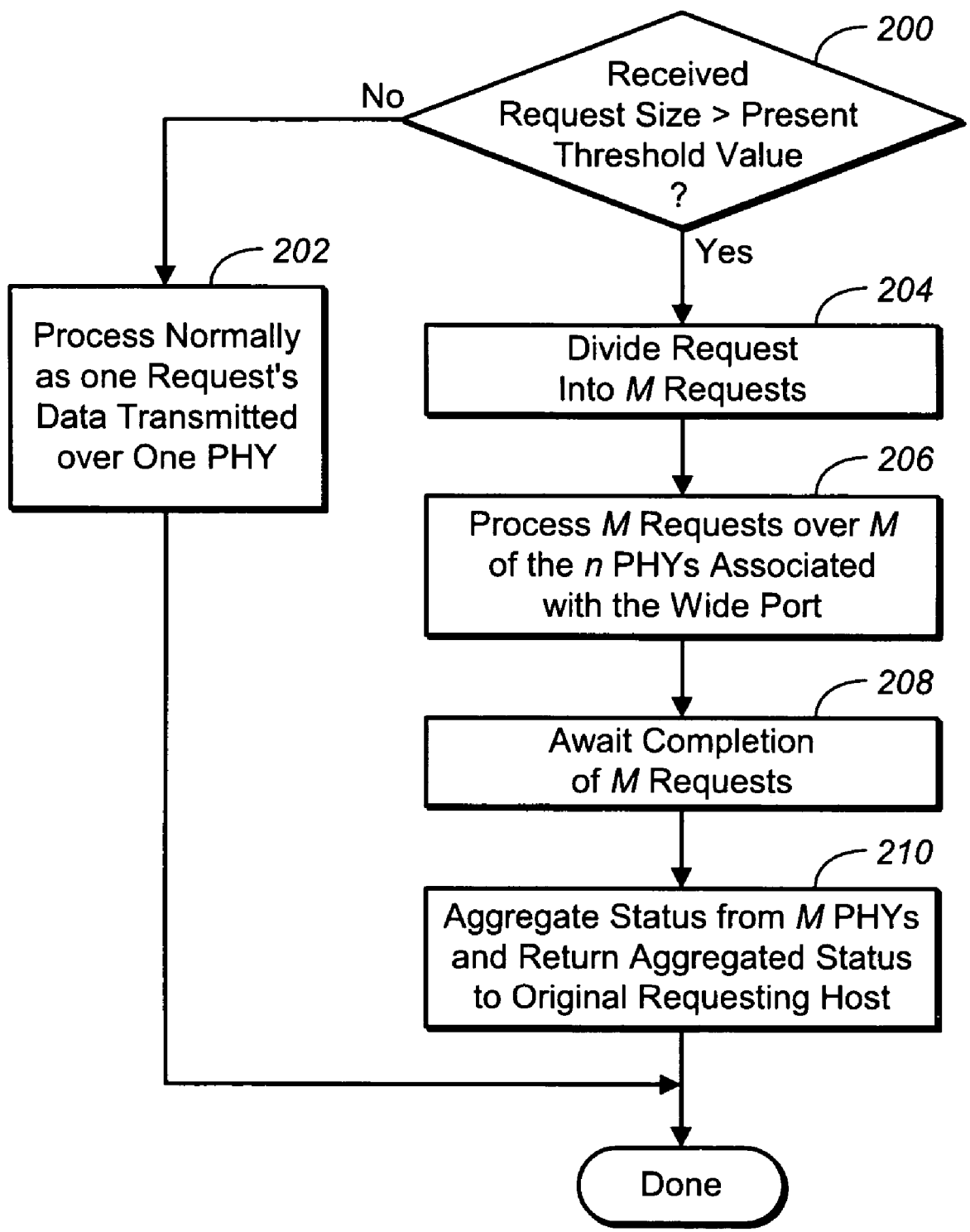
FIG._2

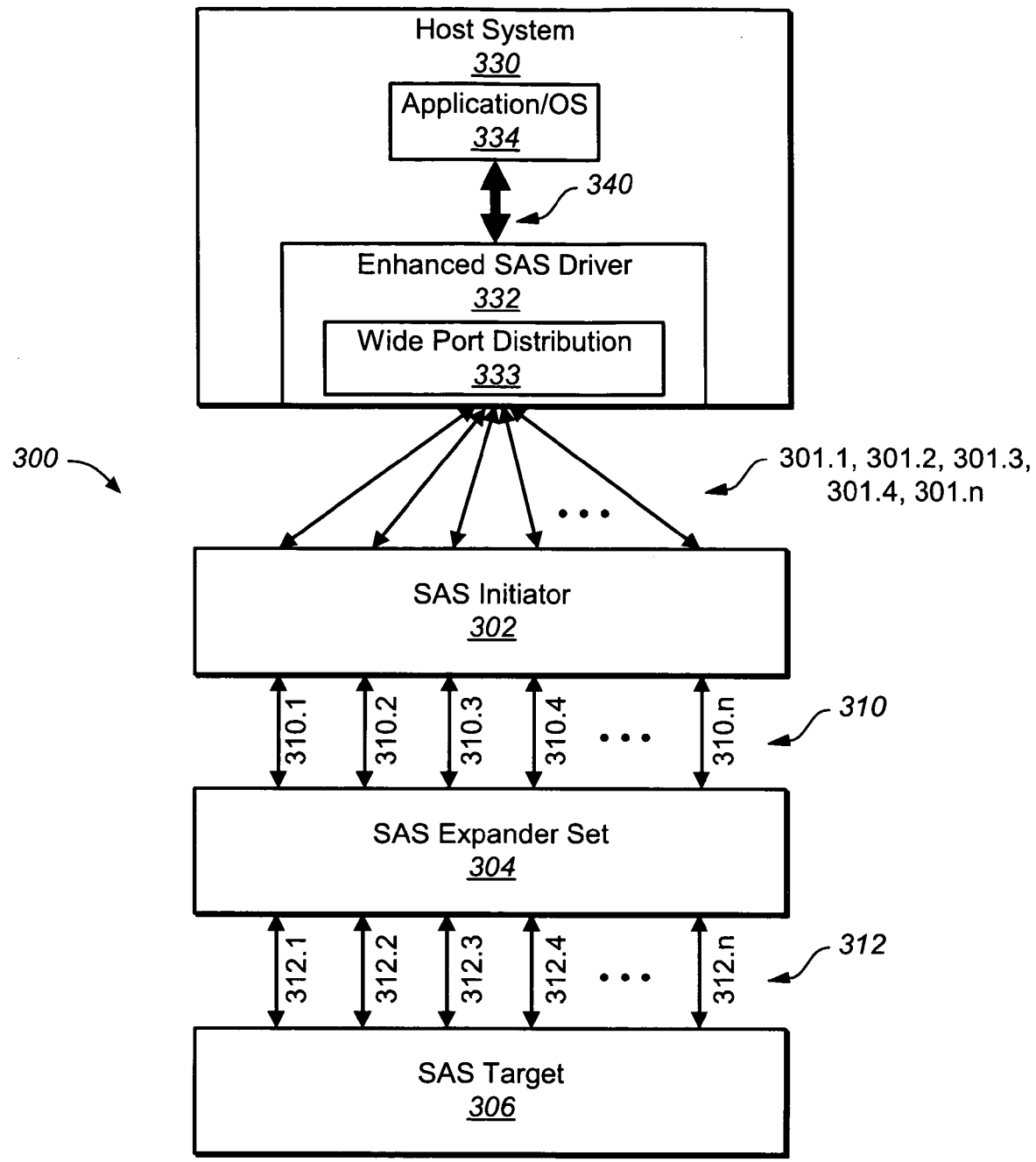
FIG._3

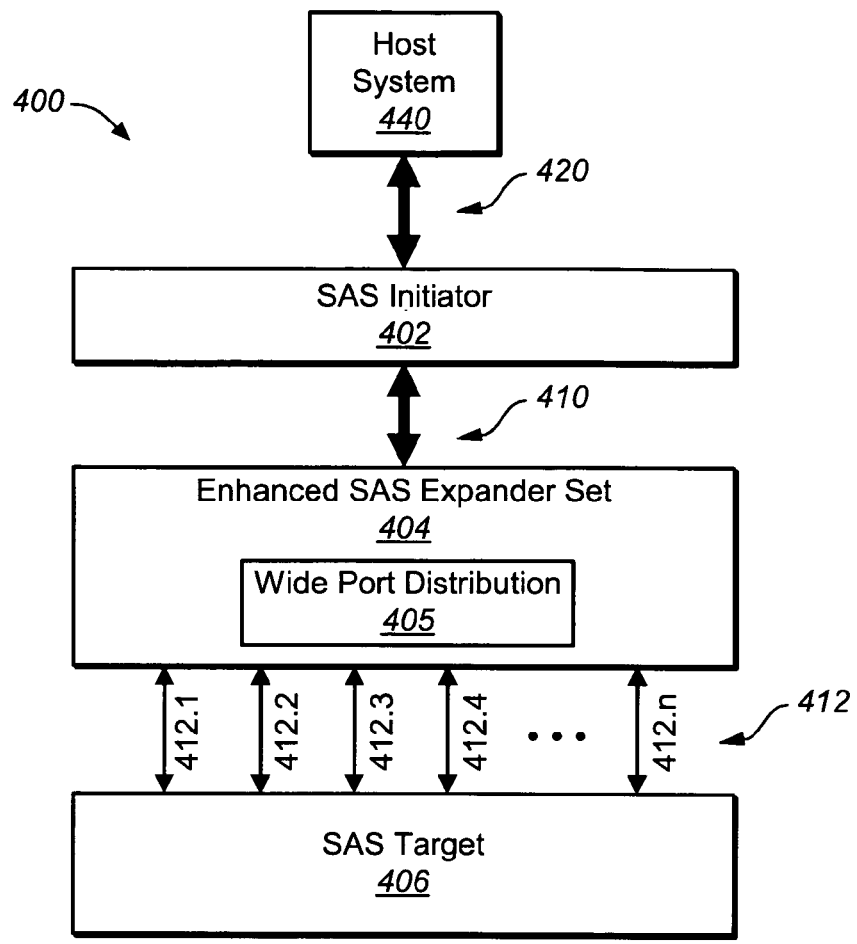
FIG._4
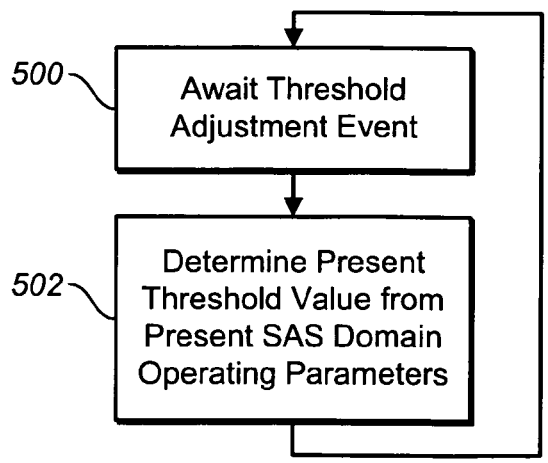
FIG._5

METHODS AND STRUCTURE FOR IMPROVED TRANSFER RATE PERFORMANCE IN A SAS WIDE PORT ENVIRONMENT

BACKGROUND OF THE INVENTION

1. Field of the Invention

The invention relates generally to serial attached SCSI ("SAS") communications and more specifically relates to methods and structures to improve transfer rate performance (i.e., bandwidth utilization) in a wide SAS port environment.

2. Discussion of Related Art

Small Computer Systems Interface ("SCSI") is a set of American National Standards Institute ("ANSI") standard electronic interface specification that allow, for example, computers to communicate with peripheral hardware. Common SCSI compatible peripheral devices may include: disk drives, tape drives, Compact Disc-Read Only Memory ("CD-ROM") drives, printers and scanners. SCSI as originally created included both a command/response data structure specification and an interface and protocol standard for a parallel bus structure for attachment of devices. SCSI has evolved from exclusively parallel interfaces to include both parallel and serial interfaces. "SCSI" is now generally understood as referring either to the communication transport media (parallel bus structures and various serial transports) or to a plurality of primary commands common to most devices and command sets to meet the needs of specific device types as well as a variety of interface standards and protocols.

The collection of primary commands and other command sets may be used with SCSI parallel interfaces as well as with serial interfaces. The serial interface transport media standards that support SCSI command processing include: Fibre Channel, Serial Bus Protocol (used with the Institute of Electrical and Electronics Engineers 1394 FireWire physical protocol; "IEEE 1394") and the Serial Storage Protocol (SSP).

SCSI interface transports and commands are also used to interconnect networks of storage devices with processing devices. For example, serial SCSI transport media and protocols such as Serial Attached SCSI ("SAS") and Serial Advanced Technology Attachment ("SATA") may be used in such networks. These applications are often referred to as storage networks. Those skilled in the art are familiar with SAS and SATA standards as well as other SCSI related specifications and standards. Information about such interfaces and commands is generally obtainable at the website http://www.t10.org.

Such SCSI storage networks are often used in large storage systems having a plurality of disk drives to store data for organizations and/or businesses. The network architecture allows storage devices to be physically dispersed in an enterprise while continuing to support SCSI commands directly. This architecture allows for distribution of the storage components in an enterprise without the need for added overhead in converting storage requests from SCSI commands into other network commands and then back into lower level SCSI storage related commands.

A SAS network typically comprises one or more SAS initiators coupled to one or more SAS targets via one or more SAS expanders. In general, as is common in all SCSI communications, SAS initiators initiate communications with SAS targets. The expanders expand the number of ports of a SAS network domain used to interconnect SAS initiators and SAS targets (collectively referred to as SAS devices or SAS device controllers).

It is a particular problem in a SAS domain to fully utilize the transfer bandwidth available in a SAS wide port environment. As is generally known in the art, the SAS specifications include the ability to aggregate multiple standard SAS ports or PHYs (physical links) for use as a so called wide port. Information may be generally transferred in parallel among the multiple standard SAS ports aggregated to form the configured wide port. Such parallel transfer allows for improved bandwidth between a SAS initiator and a SAS target coupled by the configured wide port. However, SAS specifications (i.e., section 8.2.2.1 of the SAS 1.0 specification in which the state machine model is presented) require selection of a single PHY to further the transaction of a particular I/O request. The transaction will normally be completed by the transfer of multiple data frames but those data frames will typically be transferred on a single PHY, either until the I/O is complete or until a "credit blocked" situation occurs (a "credit blocked" situation is a flow control mechanism for a port as defined by the SAS specifications and as generally known to those of ordinary skill in the art). The SAS specifications thereby preclude full utilization of the enhanced bandwidth of a configured wide port where a single large frame (i.e., large block) is to be transferred. Rather, the SAS specification contemplates simultaneous transmission of multiple independent frames—each over an independent PHY of the multiple PHYs aggregated to provide the desired wide port. Since SAS specifications require a single SAS frame to be transmitted over a single selected PHY link, other PHY links (i.e., ports) of the configured wide port may go unutilized or underutilized. In addition, use of a single PHY link will impose the maximum possible latency on a particular transaction.

It is evident from the above discussion that an ongoing need exists for improving transfer bandwidth utilization of configured SAS wide ports.

SUMMARY OF THE INVENTION

The present invention solves the above and other problems, thereby advancing the state of the useful arts, by providing methods and associated structure for better utilizing available bandwidth of multiple ports/PHY links of a configured SAS wide port for transmission of a large transaction. In one aspect hereof, large blocks intended for transmission as a single transaction frame are broken into a plurality of smaller blocks and then transmitted as multiple individual frames over multiple ports/PHYs of a configured SAS wide port. A SAS initiator operating in accordance with features and aspects hereof may employ algorithms and structures to examine incoming I/O requests. If a particular I/O request is larger than a specified, pre-determined, threshold size, the large request may be broken into any number of smaller I/O requests. The number of such smaller I/O requests may be any number up to a maximum equal to the number of PHYs or ports that comprise the configured SAS wide port. In one aspect hereof, the predetermined threshold size may be determined either statically or dynamically based on present worloads performed by the SAS initiator and target devices.

One feature hereof therefore provides a method for improving utilization of a SAS wide port having a number (n) PHYs associated therewith, the method comprising: receiving an I/O request from a requesting host system requesting a transaction involving a range of data having a size of S units of data; determining if the size of the I/O request data (S) is greater than a threshold size (T); in response to a determination that S>T, performing the steps of: determining a number (M) of PHYs available for use to process the I/O request; subdividing the I/O request into M smaller I/O requests of substantially equal size; processing the M smaller requests substantially in parallel using the M available PHYs; and returning a single status to the requesting host system indicating the status of the processing of the M smaller requests.

Another aspect hereof provides that the method further comprises statically determining the value of T.

Another aspect hereof provides that the method further comprises dynamically determining the value of T.

Another aspect hereof further provides that the step of dynamically determining further comprises: dynamically determining the value of T as a function of a number of currently outstanding transactions.

Another aspect hereof further provides that the method is operable within a SAS driver of a host system's operating system.

Another aspect hereof further provides that the method is operable within a SAS initiator device controller.

Another feature provides a method operable in a SAS domain having a SAS wide port coupling a SAS initiator to a SAS target, the method comprising: generating a large I/O request directed toward the SAS target; splitting the large I/O request into a plurality of smaller I/O requests; distributing the smaller I/O requests over a plurality of the PHYs that comprise the SAS wide port; detecting completion of the plurality of smaller I/O requests; and completing the large I/O request in response to detecting completion of each of the plurality of smaller I/O requests.

Another aspect hereof provides that the method further comprises: determining whether the large I/O request is larger than a threshold value, wherein the steps of splitting, distributing, detecting and completing are responsive to a determination that the large I/O request is larger than the threshold value.

Another aspect hereof provides that the method further comprises dynamically determining the threshold value as a function of operating parameters of the SAS domain.

Another aspect hereof further provides that the plurality of PHYs includes a number (n) of PHYs that comprise the SAS wide port and wherein the step of splitting further comprises: splitting the large I/O request into a number (M) of smaller I/O requests where M<=n.

Another aspect hereof provides that the method further comprises determining M as the maximum number of PHYs available to process the smaller I/O requests.

Another aspect hereof further provides that the SAS domain includes a host system incorporating the SAS initiator and wherein the host system has a driver for communicating with the SAS initiator and wherein the method is operable in the driver of the host system.

Another aspect hereof further provides that the method is operable in the SAS initiator.

Another aspect hereof further provides that the SAS domain includes a SAS expander coupled intermediate the SAS initiator and the SAS target and coupled to each by corresponding SAS wide ports and wherein the steps of splitting, distributing and detecting are operable within the SAS expander.

BRIEF DESCRIPTION OF THE DRAWINGS

FIG. 1 is a block diagram of an exemplary system embodying features and aspects hereof for improved utilization of a SAS wide port.

FIG. 2 is a flowchart describing a method in accordance with features and aspects hereof to distribute a large I/O request to multiple PHYs of a SAS wide port.

FIG. 3 is a block diagram of another exemplary system embodying features and aspects hereof for improved utilization of a SAS wide port.

FIG. 4 is a block diagram of another exemplary system embodying features and aspects hereof for improved utilization of a SAS wide port.

FIG. 5 is a flowchart describing a method in accordance with features and aspects hereof to dynamically determine a threshold value for the size of I/O requests to be redistributed in accordance with features and aspects hereof.

DETAILED DESCRIPTION OF THE DRAWINGS

FIG. 1 is a block diagram of a system 100 embodying features and aspects hereof to improve utilization of a SAS wide port in a SAS domain. Host system 130 generates large I/O requests (potentially in addition to other I/O requests) and applies the generated requests via path 120 to enhanced SAS initiator 102. In general, SAS initiator 102 may be integrated within an appropriate host bus adapter or other peripheral adapter component within host system 130 and may be implemented as custom or commercially available controller circuits or suitably programmed instructions executed on a general or special purpose processor.

Enhanced SAS initiator 102 is enhanced by the addition of wide port distribution logic 103 providing features and aspects hereof operable within the SAS initiator. Those of ordinary skill in the art will recognize that enhanced SAS initiator 102 may be a custom designed circuit or commercially available SAS device controller operating as an initiator in SAS exchanges. Features and aspects hereof to improve utilization of a wide port coupled to the SAS initiator 102 may be implemented as additional customized circuitry within SAS initiator 102 or as suitably programmed instructions executed by an appropriate general or special purpose processor (not shown) with an enhanced SAS initiator 102.

In the SAS domain generally shown in FIG. 1, the enhanced SAS initiator 102 is coupled to a SAS expander set 104 via wide port 110. SAS wide port 110 is comprised of a plurality of standard SAS ports or PHYs 110.1 through 110.n. As noted above, in accordance with present practices compliant with SAS specifications, the data transfer associated with a large I/O request generated by host system 130 may be applied as a single frame or a sequence of frames to a single PHY of wide port 110. For example, the large data transfer may be applied to PHY 110.1 leaving PHYs 110.2 through 110.n unused with respect to this particular large I/O request. SAS specifications permit other requests to be transferred over the other available PHYs (110.2 through 110.n) but if no other I/O requests are presently awaiting processing within SAS initiator 102, the additional PHYs associated with wide port 110 simply remain unused.

In accordance with features and aspects hereof, wide port distribution logic 103 provides enhanced features and aspects for SAS initiator 102 to better utilize the available bandwidth of wide port 110. In particular, as discussed further herein below, wide port distribution logic 103 subdivides the large I/O request into a plurality of smaller I/O requests and transfers the smaller I/O requests substantially in parallel distributed over a plurality of the PHYs associated with wide port 110. As discussed further herein below, functionality of wide port distribution logic 103 may select any number of available PHYs ("M") up to the maximum number of PHYs comprising wide port 110 ("n"). In other words, any of the PHYs 110.1 through 110.n not presently in use for processing of another I/O request may be used in association with a distributed request processing of the smaller I/O requests. Wide port distribution logic 103 may allocate any of the available ports 110.1 through 110.n that may be available for use or may allocate any subset thereof.

After wide port distribution logic 103 of the enhanced SAS initiator 102 distributes the large I/O request over multiple PHYs of wide port 110, SAS expander set 104 forwards the multiple smaller requests on to SAS target 106 via corresponding wide port 112 (comprising PHYs 112.1 through 112.n).

Data and or status information returned from SAS target 106 via wide port 112 through SAS expander set 104 and wide port 110 may be accumulated by wide port distribution logic 103. The accumulated or aggregated return information is assembled as required by wide port distribution logic 103 for return to the requesting host system 130. Host system 130 therefore is shielded from the details of processing within enhanced SAS initiator 102 and is, in essence, aware only that a large I/O request was transmitted through the SAS initiator 102 and an appropriate status or response was returned therefrom. However, distribution of the large I/O request through multiple PHYs of the wide port in the SAS domain permits faster completion of the large I/O request.

Those of ordinary skill in the art will recognize that the configuration of system 100 in FIG. 1 is intended merely as exemplary of numerous equivalent configurations and topologies in which features and aspects hereof may be advantageously applied. In particular, equivalent configurations devoid of an expander set 104 may be feasible as well as configurations having a more complex SAS expander set consisting of any number of expanders consistent with SAS specifications and associated couplings therebetween. FIG. 1 is therefore intended merely as exemplary of one possible embodiment in which features and aspects hereof may be advantageously applied and specifically implemented within logic associated with an enhanced SAS initiator 102.

FIG. 3 shows another embodiment providing features and aspects hereof in which wide port distribution logic 333 is integrated within an enhanced SAS driver module 332 operating within host system 330. The enhanced SAS driver is stored in a computer readable storage medium. As distinct from the system of FIG. 1, system 300 of FIG. 3 shows the enhanced distribution features for improved utilization of SAS wide ports to be implemented within driver software modules of the host system 330. In system 300, an application program or operating system 334 within host system 330 generates a large I/O request applied via path 340 to the enhanced SAS driver 332. Path 340 may therefore represent any appropriate interprocess or driver API software technique as a matter of design choice well known to those of ordinary skill in the art. Wide port distribution logic 333 within the enhanced SAS driver 332 then distributes the large I/O request to a subset of the available paths 301.1 through 301.n coupling the enhanced SAS driver to the SAS initiator 302. Paths 301.1 through 301.n may be any appropriate communication medium and protocol between the driver 332 and the SAS initiator 302. For example, paths 301.1 through 301.n may be logical paths implemented as a software/hardware/firmware interface over a PCI bus. In particular, where a PCI Express bus standard is used for such communication, paths 301.1 through 301.n may be PHYs in accordance with the PCI Express specifications. Numerous other examples for such communications will be readily apparent to those of ordinary skill in the art. As noted above, SAS initiator 302 may be any suitable logic such as, for example, a host bus adapter or other SAS compatible I/O adapter circuits coupled to the host system bus.

SAS initiator 302 therefore receives a plurality of smaller I/O requests via paths 301.1 through 301.n and forwards each of the smaller I/O requests via corresponding PHYs 310.1 through 310.n to SAS expander set 304. Paths 301.1 through 301.n may be virtual communication links as noted above implemented in software/hardware/firmware customized features. Data may flow over any subset of the "n" paths so defined (any subset of the paths 301.1 through 301.n). Expander set 304 receives the smaller requests from its wide port 310 and forwards the smaller I/O requests through corresponding PHYs 312.1 through 312.n of wide port 312 to SAS target 306. SAS target 306 receives the plurality of smaller I/O requests and processes the requests appropriately. Response information or data is returned for each of the smaller I/O requests on corresponding PHYs 312.1 through 312.n back to SAS initiator 302 for return to enhanced SAS driver 332 via paths 301.1 through 301.n. As above with respect to FIG. 1, enhanced SAS driver 332 accumulates or advocates the returned status information and/or data and provides the aggregated status information and/or data to the requesting application or operating system 334.

A disadvantage of providing such logic within an enhanced SAS driver of the host system arises from the need for driver software upgrade/modification such that standard existing ("legacy") operating system drivers are no longer usable. In other words, the host system is not transparent to the enhanced operation but rather, must be modified to provide the enhanced features. In addition, driver software operable within the host system may not have sufficient visibility to the progress of other SAS transactions within the SAS domain and therefore may make less than optimal decisions regarding which large transactions may be best subdivided and into how many smaller requests. However, in certain applications, it may be advantageous to implement features and aspects hereof within the host system due to other design and complexity constraints.

FIG. 4 represents yet another embodiment providing features and aspects hereof to subdivide a large I/O request into a plurality of smaller I/O requests to thereby better utilize available bandwidth in a SAS wide port environment. FIG. 4 differs from FIGS. 1 and 3 in that the wide port distribution logic 405 may be integrated within an enhanced SAS expander set 404. System 400 is therefore operable to receive a large I/O request generated by host system 440 and applied via path 422 to SAS initiator 402. As above with regard to SAS initiators in FIGS. 1 and 3, SAS initiator 402 of FIG. 4 may be implemented, for example, as a host bus adapter or other circuitry within the host system for adapting internal bus structure requests for application to a SAS domain.

SAS initiator 402 then forwards the large I/O request via path 410 to enhanced expander set 404. As noted above, SAS initiator 402 may apply the large I/O request to a single PHY as specified in the SAS specifications. Enhanced SAS expander set 404 then utilizes wide port distribution logic 405 to subdivide the large I/O request into a plurality of smaller I/O requests each applied to a corresponding PHY 412.1 through 412.n of SAS wide port 412 coupling the expander 404 to SAS target 406. SAS target 406 then processes the plurality of smaller I/O requests and returns any associated data or status through corresponding PHYs 412.1 through 412.n of SAS wide port 412 to expander set 404. Expander set 404 utilizing wide port distribution logic 405 then accumulates or aggregates the individual return Information (status or data) generated by processing within target 406 of each of the smaller I/O requests. The information so aggregated or accumulated is then returned from enhanced SAS expander set 404 via path 410 to SAS initiator 402 which, in turn, returns appropriate information to requesting host system 440 via path 420.

Those of ordinary skill in the art will recognize that FIGS. 3 and 4 are intended merely as exemplary of configurations in which features and aspects hereof may be advantageously applied. Those of ordinary skill in the art will recognize a wide variety of equivalent configurations and SAS domain topologies in which features and aspects hereof to better utilize available bandwidth of a SAS wide port may be advantageously applied. In particular, those of ordinary skill in the art will recognize SAS domain topologies having multiple initiators, targets, expanders and expander sets and topologies having targets and initiators directly coupled to one another devoid of expanders. The additional logic in FIGS. 1, 3 and 4 for the wide port distribution logic may be implemented within any of several hierarchical layers of a SAS domain including, for example, within a host system driver module, within a SAS initiator associated with a host system, or within a SAS expander associated with the SAS domain. Such design choices will be readily apparent to those of ordinary skill in the art in accordance with the particular needs and constraints of a specific application of the features and aspects hereof.

FIG. 2 is a flowchart describing a method in accordance with features and aspects hereof for improving utilization of available bandwidth in a SAS wide port. Element 200 is first operable to determine whether the data size associated with a received I/O request is greater than or equal to a present threshold value. As noted above and as discussed further herein below, a threshold value may be statically predetermined or may be dynamically determined in accordance with operating parameters of the SAS domain. If element 200 determines that the received I/O request is smaller than the present threshold value, element 202 is operable to process the received I/O request normally in accordance with SAS specifications as a single frame transaction transmitted over a single selected PHY of a wide port. If element 200 determines that the data size of the received large I/O request is greater than the present threshold value, element 204 is operable to subdivide the large received a request into a plurality of smaller I/O requests. As noted above, the number of smaller I/O requests ("M") may be determined in accordance with the number of PHYs ("n") presently available within the SAS wide port for processing of the smaller I/O requests generated by the large request subdivision of element 204. The maximum number of such smaller I/O requests may preferably be equal to the number of PHYs (n) that comprise the wide port (i.e., the number of smaller I/O requests M is less than or equal to the number of PHYs n comprising the wide port).

Element 206 then represents processing of the M smaller I/O requests as transmitted over the available PHYs associated with the wide port. As noted, the M selected PHYs are a subset of those presently available for transmission of the smaller I/O requests selected from the n potential ports/PHYs that comprise the wide SAS port. Element 208 then awaits completion of the M smaller requests. Any data or status information generated by processing of the M smaller I/O requests at the designated SAS target will be returned over corresponding PHYs of the M selected and presently available PHYs of the wide port. Element 210 then aggregates or accumulates the returned status and/or data from the M selected PHYs and returns the aggregated or accumulated status to the original requesting host system.

As noted above, the threshold value used to determine whether a request is sufficiently large to be subdivided may be statically pre-determined or may be dynamically determined in accordance with present operating parameters and status of the SAS domain. FIG. 5 is a flowchart describing periodic operations to dynamically adjust the threshold value. Element 500 is operable to await detection of the next threshold determination event. Such an event may be the expiration of a periodic timer, receipt of a SAS transaction that may change operating parameters of the SAS domain, or any other event useful in a particular application for determining the size of a large I/O request that may be advantageously subdivided. Upon receipt of such an event, element 502 is next operable to determine a present threshold value in accordance with operating parameters of the SAS domain. Exemplary of such operating parameters may be present utilization of various PHYs of a corresponding wide port or any other parameters descriptive of the present operating state of the SAS domain. Having so determined a present threshold value, processing continues looping back to element 500 to await the next qualifying event for further determination of the present threshold value.

Those of ordinary skill in the art will recognize that the flowcharts of FIGS. 2 and five are intended merely as exemplary of possible implementations of features and aspects hereof. Those of ordinary skill in the art will recognize a wide variety of equivalent methods for determining present threshold values and for subdividing large I/O requests that exceed the present threshold value into a plurality of smaller I/O requests. In addition, as noted above, those of ordinary skill in the art will recognize a wide variety of environments in which the methods of FIGS. 2 and five may be implemented including, for example, within a driver software module of the host system, within a SAS initiator circuit or module, or within an enhanced SAS expander set.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. A method for improving utilization of a SAS wide port having a number (n) PHYs associated therewith, the method comprising:

receiving an I/O request from a requesting host system requesting a transaction involving a range of data having a size of S units of data, wherein the I/O request corresponds to an original SAS frame;

determining if the size of the original SAS frame data (S) is greater than a threshold size (T);

in response to a determination that S>T, performing the steps of:

determining a number (M) of the n PHYs available for use to process the original SAS frame;

subdividing the original SAS frame into M smaller SAS frames of substantially equal size;

processing the M smaller SAS frames substantially in parallel using the M available PHYs; and returning a single status to the requesting host system indicating the status of the processing of the M smaller SAS frames.

2. The method of claim 1 further comprising statically determining the value of T.

3. The method of claim 1 further comprising dynamically determining the value of T.

4. The method of claim 3 wherein the step of dynamically determining further comprises:

dynamically determining the value of T as a function of a number of currently outstanding transactions.

5. The method of claim 1 wherein the method is operable within a SAS driver of a host system's operating system.

6. The method of claim 1 wherein the method is operable within a SAS initiator device controller.

7. The method of claim 1 wherein the method is operable within a SAS expander forwarding a request from a SAS initiator to a SAS target.

8. A method operable in a SAS domain having a SAS wide port coupling a SAS initiator to a SAS target, the method comprising:

generating an original I/O request directed toward the SAS target, wherein the original I/O request corresponds to an original SAS frame;

splitting the original SAS frame into a plurality of smaller SAS frames;

distributing the smaller frames over a plurality of the PHYs that comprise the SAS wide port;

detecting completion of the plurality of smaller SAS frames; and completing the original I/O request in response to detecting completion of each of the plurality of smaller SAS frames.

9. The method of claim 8 further comprising:

determining whether the original SAS frame is larger than a threshold value, wherein the steps of splitting, distributing, detecting and completing are responsive to a determination that the original SAS frame is larger than the threshold value.

10. The method of claim 9 further comprising:

dynamically determining the threshold value as a function of operating parameters of the SAS domain.

11. The method of claim 8 wherein the plurality of PHYs includes a number (n) of PHYs that comprise the SAS wide port and wherein the step of splitting further comprises:

splitting the original SAS frame into a number (M) of smaller SAS frames where M<=n.

12. The method of claim 11 further comprising:

determining M as the maximum number of PHYs available to process the smaller SAS frames.

13. The method of claim 8 wherein the SAS domain includes a host system incorporating the SAS initiator and wherein the host system has a driver for communicating with the SAS initiator and wherein the method is operable in the driver of the host system.

14. The method of claim 8 wherein the method is operable in the SAS initiator.

15. The method of claim 8 wherein the SAS domain includes a SAS expander coupled intermediate the SAS initiator and the SAS target and coupled to each by corresponding SAS wide ports and wherein the steps of splitting, distributing and detecting are operable within the SAS expander.

16. A system physically embodying operational means for improving utilization of a SAS wide port having a number (n) PHYs associated therewith, the system comprising:

means for receiving an I/O request from a requesting host system requesting a transaction involving a range of data having a size of S units of data, wherein the I/O request corresponds to an original SAS frame;

means for determining if the size of the original SAS frame data (S) is greater than a threshold size (T);

means responsive to a determination that S>T, including:

means for determining a number (M) of the n PHYs available for use to process the original SAS frame;

means for subdividing the original SAS frame into M smaller SAS frames of substantially equal size;

means for processing the M smaller SAS frames substantially in parallel using the M available PHYs; and means for returning a single status to the requesting host system indicating the status of the processing of the M smaller SAS frames.

17. The system of claim 16 further comprising means for statically determining the value of T.

18. The system of claim 16 further comprising means for dynamically determining the value of T.

19. The system of claim 18 wherein the means for dynamically determining further comprises:

means for dynamically determining the value of T as a function of a number of currently outstanding transactions.

20. The system of claim 16 wherein the system is operable within a SAS driver of a host system's operating system.

21. The system of claim 16 wherein the system is operable within a SAS initiator device controller.

22. The system of claim 16 wherein the system is operable within a SAS expander forwarding a request from a SAS initiator to a SAS target.

* * * * *